United States

[11] 3,600,066

| [72] | Inventor | George D. Del Vecchio<br>Briscoe Cove, North Rose, N.Y. |
|---|---|---|
| [21] | Appl. No. | 829,605 |
| [22] | Filed | June 2, 1969 |
| [45] | Patented | Aug. 17, 1971 |
| [73] | Assignee | Xerox Corporation<br>Rochester, N.Y. |

[54] OPTICAL ASSEMBLY WITH SUPPLEMENTAL LENS MEANS
8 Claims, 7 Drawing Figs.

[52] U.S. Cl.................................................. 350/183, 350/187, 355/58
[51] Int. Cl............................................ G02b 7/04, G02b 15/02
[50] Field of Search........................................ 350/38, 39, 28, 44, 183, 184, 187, 254, 212, 214; 355/58; 95/45

[56] References Cited
UNITED STATES PATENTS
2,273,430  2/1942  Bing.............................. 350/254 X
2,985,070  5/1961  Lane.............................. 350/183

FOREIGN PATENTS
310,627  9/1918  Germany...................... 350/38
449,290  4/1968  Switzerland.................. 350/187

Primary Examiner—John K. Corbin
Attorneys—Norman E. Schrader, James J. Ralabate and Michael J. Colitz, Jr.

ABSTRACT: An optical assembly capable of being used in a machine for reproducing documents at one of a plurality of optical reduction rates. The optical assembly includes a first lens movable along the optical path and second and third lenses selectively movable into and out of the optical path. The first, second and third lenses are operatively coupled so that movement of the first lens along the optical path will cause the camming in of the second or third lens into the optical path at the proper positioning of the first lens to thus achieve the various optical reduction rates.

INVENTOR.
GEORGE D. DEL VECCHIO

ATTORNEY

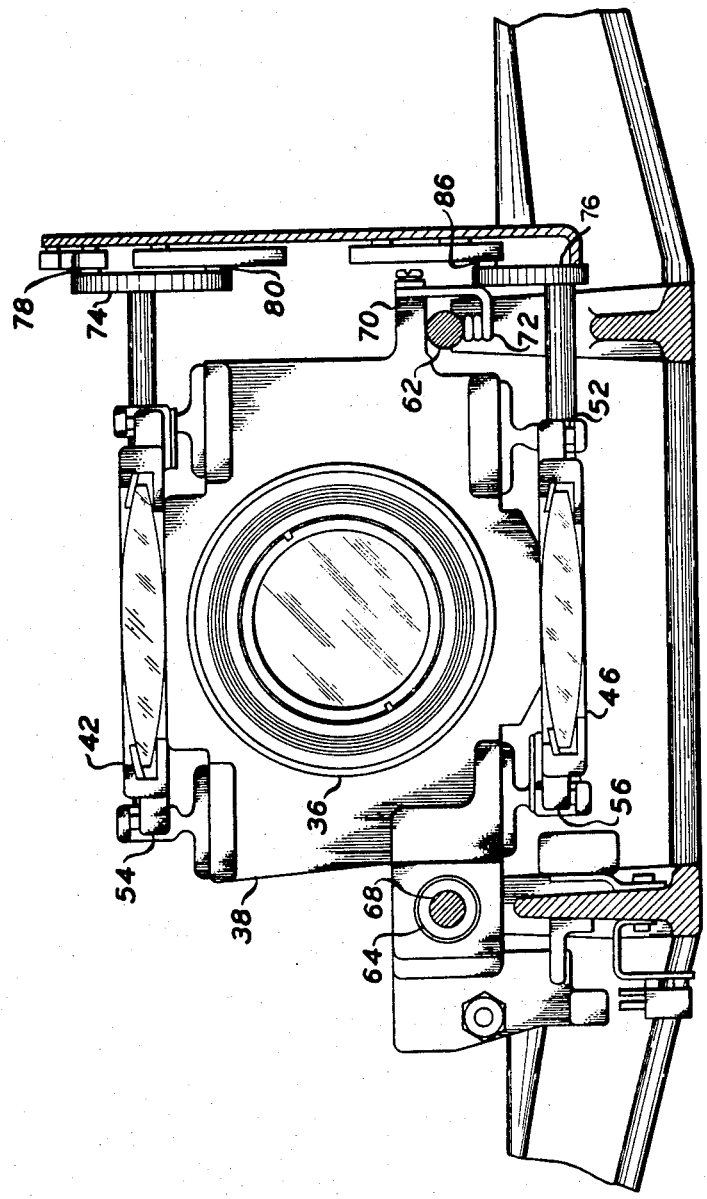

OPTICAL ASSEMBLY WITH SUPPLEMENTAL LENS MEANS

This invention relates to an optical assembly and in particular, to an optical assembly including a main lens and selectively usable supplemental lenses for varying the optical rate of a fixed conjugate length optical system.

In the process of xerography, as described in U.S. Pat. No. 2,297,691 to Chester F. Carlson, a xerographic surface comprising a layer of photoconductive insulating material affixed to a conductive backing is used to support electrostatic images. In the usual method of carrying out the process, the xerographic surface is electrostatically charged uniformly over its surface and then exposed to a light pattern or the image being reproduced to thereby discharge the charge in the areas where light strikes the layer. The undischarged areas of the layer thus form an electrostatic charge pattern in conformity with the configuration of the original light pattern.

The latent electrostatic image can be then developed by contacting it with a finely divided electrostatically attractable material such as powder. The powder is held in image areas by the electrostatic charges on the layer. Where the charge field is greatest, the greatest amount of material is deposited; where the charge field is least, little or no material is deposited. Thus a powder image is produced in conformity with the light image of the copy being reproduced. The powder is subsequently transferred to a sheet of paper or other surface and suitably affixed thereto to form a permanent print.

Most xerographic equipment in commercial use today is adapted to create copies of originals at about a 1:1 optical rate. That is to say, it reproduces the original in size as well as content.

The present invention is directed to apparatus for imaging at either the 1:1 optical rate or any of a plurality of optical reduction rates while creating an undistorted reproduction of the original.

In optical systems having a single lens, optical magnifications or reductions may be attained by varying the lens position along the optical path and then varying the conjugate distance of the system to retain undistorted imaging. In order to achieve optical variations in a fixed conjugate length optical system, containing a main lens, it is necessary to move the lens along the optical path and then change the properties of the lens by adding or subtracting a supplemental corrective lens element to or from the system. The apparatus of the instant invention is directed to this end and is constructed so that the supplemental corrective lens elements are automatically added to the system when the main lens element is at the proper position along the optical path. Apparatus is also included to assure that the lens elements are fixedly positioned during optical imaging and that they are unaffected by undesired movement.

It is therefore an object of the instant invention to optically image.

It is a further object of the instant invention to optically image at any one of a plurality of preselected optical rates.

It is a further object of the instant invention to vary the optical properties of a lens assembly in a fixed conjugate length optical system.

It is a further object of the instant invention to scan a document and to project light images thereof towards a light responsive surface.

It is a further object of the instant invention to add and/or remove corrective lenses from a main lens by camming actions responsive to the movement of the main lens along the optical path.

It is a further object of the instant invention to create xerographic copies of originals at either the same size as the original or any one of a plurality of optical reduction rates in response to the positioning of a main lens along the optical path and the presence and/or absence of additional corrective lens along the path.

These and other objects of instant invention are attained in accordance with the present invention by an optical assembly including a main lens movable along the optical path in conjunction with supplemental corrective lenses movable into and out of the optical path. When the first or main lens is in a first position, the supplemental lenses are in a position removed from the optical path. Movement of the main lens will cause a cam follower to ride along a fixed cam to swing a second lens into the optical path until the first and second lenses are automatically stopped at a predetermined location at which time a second optical reduction rate may be achieved. Further movement of the main lens will permit the second lens to be withdrawn from the optical path and will then cause a second lens to be withdrawn from the optical path and will then cause a second cam follower to ride along a second fixed cam to swing a third lens into the optical path. Stoppage of the first and third lenses at a predetermined location allows optical imaging to occur at the third optical reduction rate.

Further objects of this invention together with additional features and advantages thereof will become apparent from the following description of one embodiment of the invention when read in conduction with the accompanying drawings, wherein:

FIG. 5 is a sectional view taken along lines 5—5 of FIG. 4;

Figure 1:
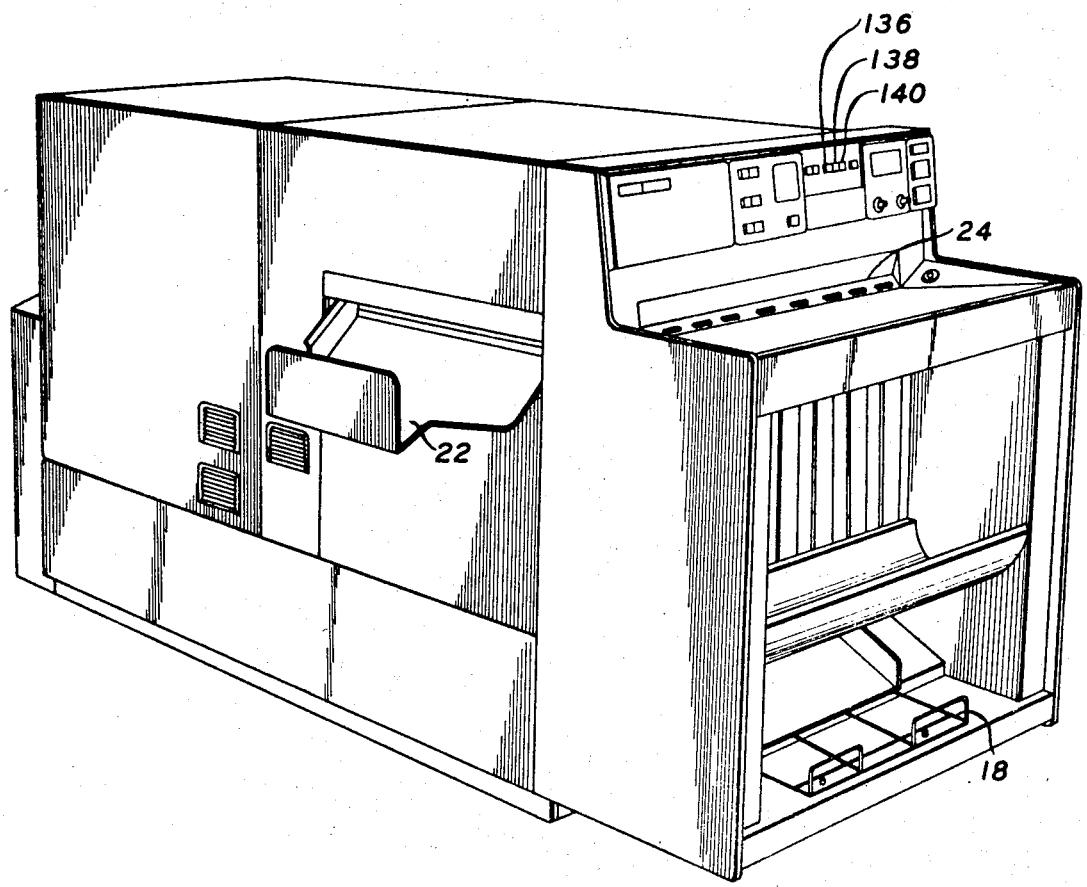
FIG. 1 is a perspective view of a continuous automatic xerographic reproducing machine employing the optical system of the instant invention.
Figure 2:
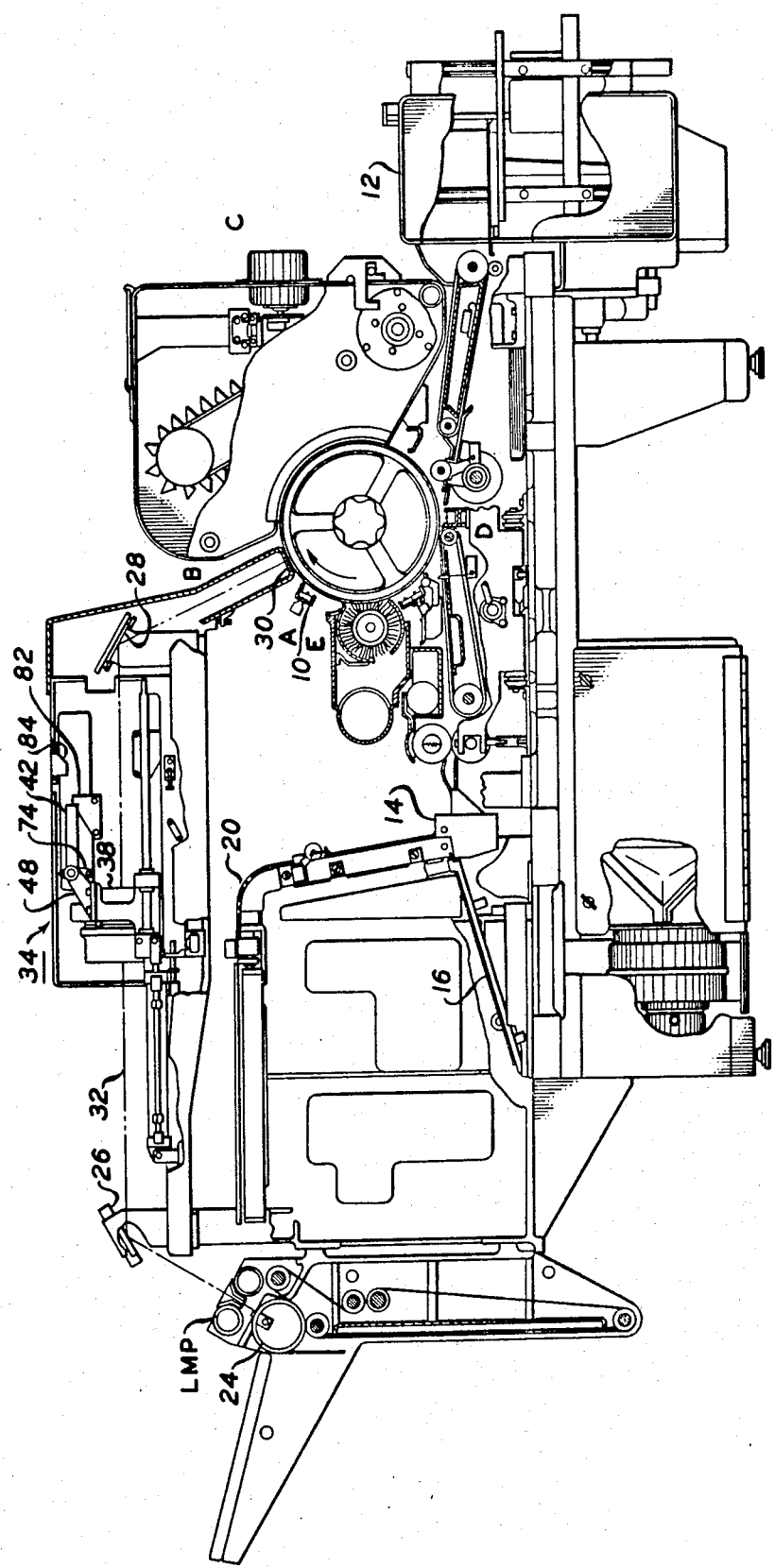
FIG. 2 is a schematic representation of the xerographic reproducing machine as shown in FIG. 1.

Referring now to the drawings, there is shown schematically in FIG. 2 an embodiment of the subject invention in a suitable environment such as an automatic xerographic reproducing machine. The automatic xerographic reproducing machine includes a xerographic plate or surface 10 formed in the shape of a drum. The plate has a photoconductive layer or light receiving surface on a conductive backing journaled in a frame to rotate in the direction indicated by the arrow. The rotation will cause the plate surface to sequentially pass a series of xerographic processing stations. For the purposes of the present disclosure, the several xerographic processing stations in the path of movement of the plate surface may be described functionally as follows:

A charging station A, at which a uniform electrostatic charge is deposited on the photoconductive plate;

An exposure station B, at which light or radiation pattern of copy to be reproduced is projected onto the plate surface to dissipate the charge in the exposed areas thereof to thereby form a latent electrostatic image of the copy to be reproduced;

A developing station C at which xerographic developing material, including toner particles having an electrostatic charge opposite to that of the latent electrostatic image, is cascaded over the plate surface whereby the toner particles adhere to the latent electrostatic image to form a toner image in a configuration of the copy being reproduced;

A transfer station D at which the tone image is electrostatically transferred from the plate surface to a transfer material or a support surface; and A drum cleaning and discharge station E at which the plate surface is brushed to remove residual toner particles remaining thereon after image transfer and exposed to a relatively bright light source to effect substantially complete discharge of any residual electrostatic charge remaining thereon.

It is felt that the preceding description of the xerographic process is sufficient for an understanding of the instant invention. Further details of the xerographic apparatus may be had by reference to U.S. Pat. No. 3,301,126 issued to Robert F. Osborne et. al.

In addition to the above described apparatus disclosed in the aforementioned Osborne et al. patent, the xerographic machine, as shown particularly in FIG. 2, may be provided with a copy sheet support assembly 12 of the type disclosed in pending application Ser. No. 829,607 filed concurrent herewith in the names of George V. DelVecchio et al. After the toner image is formed onto the copy sheet and affixed thereto, the copy sheet may be directed by a sheet directing and folding assembly 14 of the type disclosed in pending application Ser. No. 829,365 filed concurrent herewith in the names George V. DelVecchio et al. In this manner, the copy sheet may be directed along a first sheet feed path 16 to copy catch tray 18 or, in the alternative, the copy sheet may be directed along the second sheet feed path 20 toward the second copy catch tray 22.

The original document to be reproduced is supported and moved through the first end of the imaging path by a document conveyor assembly 24 which may be of a type disclosed in pending application Ser. No. 829,680 filed concurrent herewith in the names of George V. DelVecchio et al. As the original document is rotated beneath one end of the imaging path, it is illuminated by lamps LMPS to flowingly project an image to object mirror 26 to image mirror 28 through light shield 30 and onto the rotating photoconductor surface 10. Along the optical path 32, between the object and image mirrors 26 and 28, is the optical assembly 34 which forms the basis of the instant invention. As can be understood, all of the elements within the imaging system are light shielded so that the projected light rays are unaffected by supplemental light entering the system from exterior thereof.

Figure 7:
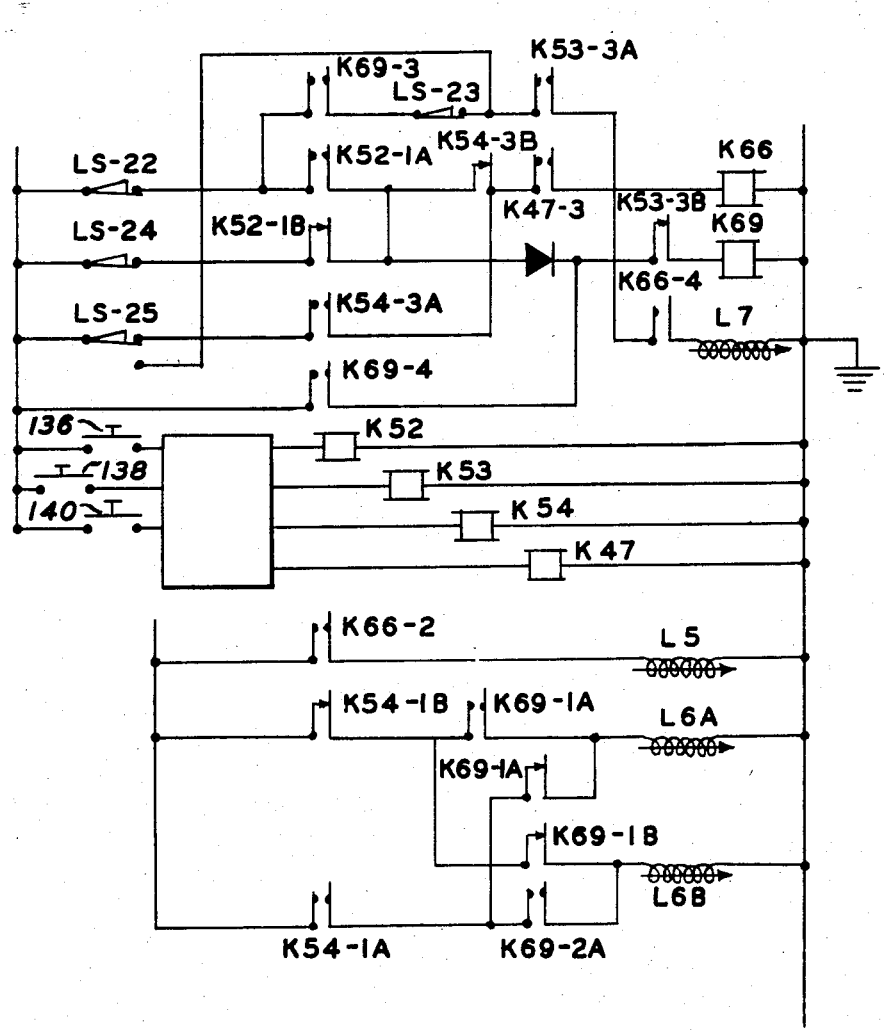
FIG. 7 is an electrical schematic of the programming mechanisms for the lens elements.
Figure 6:
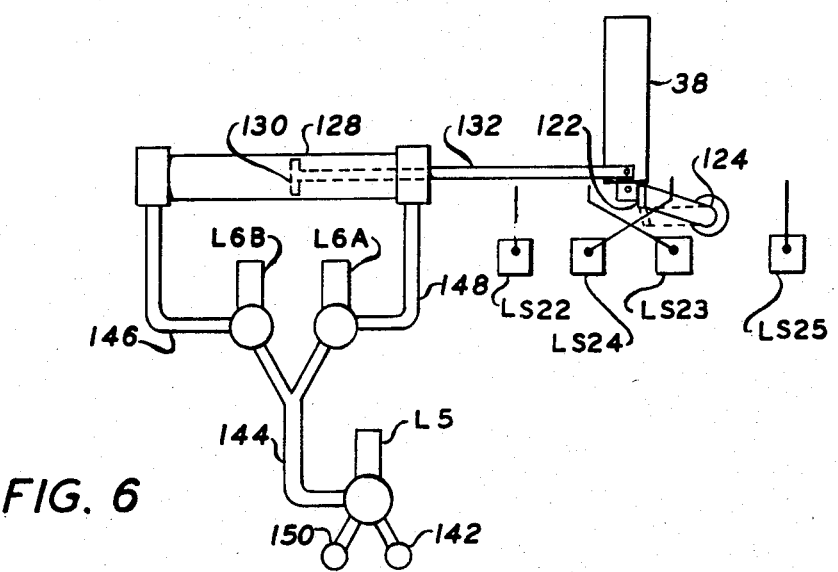
FIG. 6 is a diagrammatic illustration of the pneumatic elements employed to move the imaging elements and the switches employed in association therewith.

The apparatus forming the functioning mechanisms of the optical assembly are specifically shown in FIGS. 3—6. The mechanisms for causing the programmed movement of the elements of the assembly are shown in the schematic illustrations of FIGS. 6 and 7.

Figure 3:
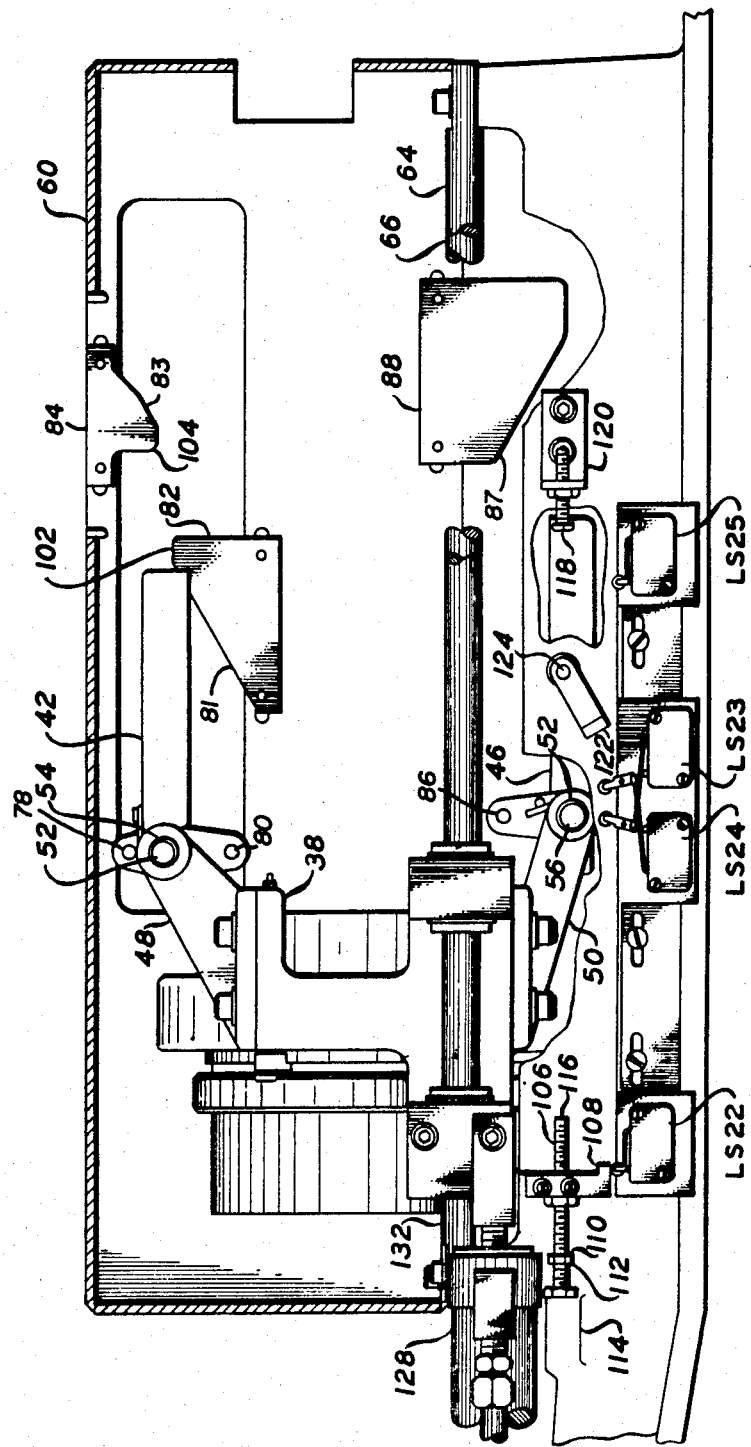
FIG. 3 is an enlarged side sectional view of the optical assembly as shown in FIG. 2.
Figure 4:
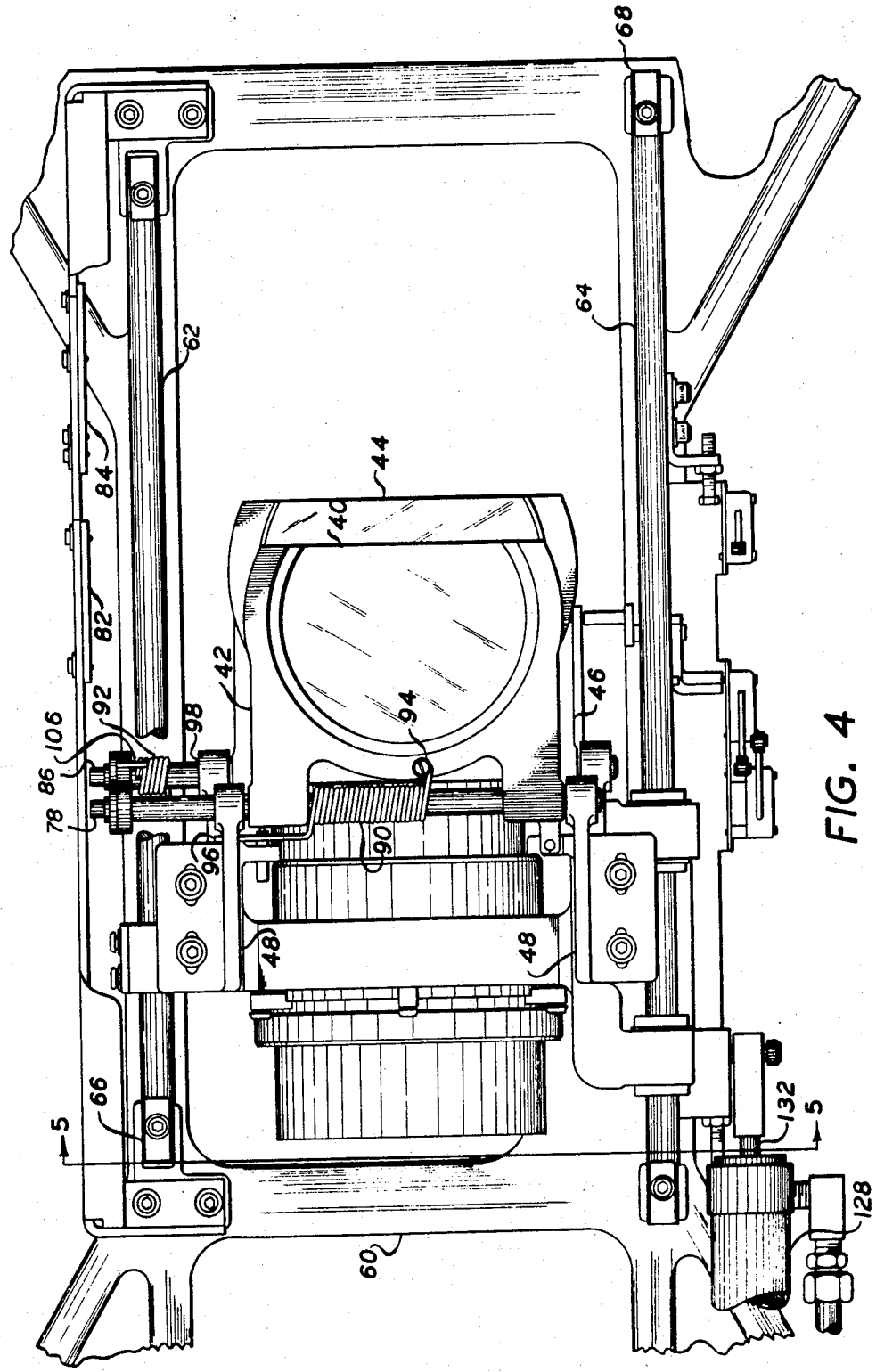
FIG. 4 is a plan view of the optical assembly shown in FIG. 3.

Referring now to the FIGS. 3, 4 and 5, there is shown a first or main lens 36 supported in a main lens carriage 38 movable along the optical path. A second or upper supplemental lens 40 is mounted in its support bracket 42 for movement therewith as is the third or lower supplemental lens 44 which is supported in a like support bracket 46.

For mounting support brackets 42 and 46 to lens carriage 38 upstanding brackets 48, 50 are bolted or otherwise secured to the main lens carriage 38. The brackets 48 and 50 are provided with bearing apertures 52 for the reception of the supplemental lens bracket support rods 54 and 56. The upper and lower lens support rods 54 and 56 have integral extensions on their inboard sides thereof and are supported in apertures 52 formed in upstanding brackets 48 and 50.

The main lens carriage 38 and consequently the upper and lower supplemental lens support brackets 42 and 46 are mounted for sliding movement with respect to the fixed optical frame casting 60 by means of support rods 62 and 64 supported on opposite sides of the main lens carriage. The support rods are bolted or otherwise secured to the main casting by means of brackets 66. The outboard side of the main lens carriage 38 has an aperture 68 formed in the carriage extension in which the outboard support rod 64 is received. The inboard side of the main carriage has a supplemental extension 70 and associated bracket 72 for slidably receiving the inboard support rod 62. These support rods 62 and 64, in addition to supporting the main lens carriage 38, will guide the movement of the carriage and three associated lenses along the optical path 32 in a manner to be described.

Mounted on the inboard side of the support rods 54 and 56 for rotation therewith are cam follower support members 74 and 76. The upper follower support member 74 is provided on opposite sides of its axis of rotation with rollers 78 and 80 which function as cam followers. The lower of these rollers 80 is adapted to cooperate with a sloping portion 81 of first cam 82 fixedly mounted on the machine frame. The upper cam roller 78 is adapted to cooperate with a sloping portion 83 of second cam 84 also fixedly mounted with respect to the machine frame. In like manner, the lower cam follower support member 76 is provided with a single roller 86 which functions as a cam follower in association with a sloping portion 87 of third cam 88 likewise fixedly mounted with respect to the machine frame.

In order to assure good contact between the various cams and cam follower rollers during their cooperation, spring means 90 and 92 are provided on both the upper and lower lens support rods. The upper spring means 90 is attached at 94 to the upper lens support bracket 46 while its opposite end is secured at 96 to a portion of the main lens carriage. In a similar manner, the second spring 92 is mounted to the bracket 50 for lower lens support rod at 98 at its first end and at 100 to a portion of the bracket 76 for the roller follower 86. These springs tend to urge the supplemental lens brackets 42 and 46 out of the optical path 32 during normal conditions.

In operation, when, for example, the main lens carriage 38 is moved from its extreme left-hand position to, where it is shown in FIG. 3, toward the right, the cam follower 80 will begin to ascend the sloping portion 81 of cam 82 to pivot the upper lens support bracket 42 into the optical path. In doing so, the upper lens support bracket 42 is moving against the internal tension of the spring 90. Once the cam follower 80 is on the crest 102 of cam 82, the upper cam follower 78 has pivoted to a position whereby it is resting on the crest 104 of cam 84. If further movement of the main lens carriage is carried out in the same direction, cam follower 80 will begin its motion along the sloping portion 83 of cam 84 by the urging of spring 90 to return the upper lens support bracket 42 to its raised position.

At the time that cam followers 78 and 80 are moving across the crests of cams 82 and 84, cam follower 86 will begin its motion along the sloping portion 87 of cam 88 to begin pivoting the lower lens support bracket 46 into the optical path. Continued motion of the main lens carriage to the extreme right-hand position as shown in FIG. 3 will thus cause the upper lens support bracket 42 to be completely withdrawn from the optical path while the lower lens support bracket 46 pivots to take its place within the optical path. The reversed motion of the main lens carriage will reverse the movement of the lenses to retract the lower lens support bracket 46 and return the upper lens support bracket 42 into the optical path. Further continued motion of the main lens carriage to the left will then retract the upper lens support bracket 42 to thus leave only the main lens carriage in the optical path.

In order to assure the proper positioning of the main lens 36, and consequently supplemental lenses 40 and 44, along the optical path, abutment surfaces are provided. The abutment surfaces include a double-faced abutment rod 106 in the form of a threaded rod adjustably mounted in a threaded downward extension 108 of the main lens carriage 38 for movement therewith. One face 110 of the abutment rod is coactable with a threaded first abutment member 112 adjustably secured with respect to the optical casting frame at 114. The second face 116 of the abutment rod 106 is coactable with a second threaded abutment member 118 adjustably mounted with respect to a threaded portion of the machine frame at 120. The abutment surface representing the intermediate position of the main lens carriage includes a shiftable abutment member 122 pivotally mounted on an actuator rod 124 in the frame. Rotary solenoid L-7 functionally operates with the actuator rod 124 to retract or insert the shiftable abutment surface into the path of the second face 116 of the movable abutment rod 106.

Movement of the main lens carriage 38 and consequently the various lens elements of the system is effected by means of air cylinder 128 having a piston 130 which is fixedly secured to the main lens carriage through arm 132. The disclosed embodiment has been constructed to attain three exemplary reduction rates. In the first position with the main lens carriage 38 to the extreme left and the supplemental lenses 40 and 44 withdrawn from the optical path, the system will produce at 100 percent magnification, that is, 1:1 optical reduction. When the main lens carriage is in the intermediate position, it will reproduce at 65 percent reduction rate with the upper supplemental lens 40 in the optical path. When the main carriage is in the extreme right-hand position with the lower supplemental lens 44 in the optical path, it will reproduce at 50 percent optical reduction. These particular reductions are selected by way of illustration only and it is to be understood that any number reductions or any specific optical reduction rates could be employed including negative reductions, i.e., enlargements.

In operation, the position of the lens carriage 38 is determined by the state of mode relays K52, K53, and K54, which correspond to the magnification of 100 relay 65 percent and 50 percent, respectively. These are energized upon the depression of the 100 percent, 65 percent, and 50 percent buttons 136, 138 and 140 on the machine console. In addition to varying the lens position, these buttons also function to vary the optical scan rate of the document conveyor 24 in a through as described in the aforementioned patent, application Ser. No. 829,608. As can be understood, the optical magnification must be correlated with the speed of scan in systems of the type disclosed so that undistorted copy may be reproduced.

Energization of K52, K53 and K54 results from the selection of the mode of operation by the operator and only one of these relays can be energized at one time. The state of the contacts of these relays used in conjunction with switches LS–22, LS–23, LS–24 and LS–25 form the logic which determines when and where the lens carriage moves. Movement to and from the intermediate lens carriage position, i.e., the 65 percent position, is unique in that this position can only be approached from the left and can be exited only to the left. This is because the abutment rod 106 of carriage 38 must back in against the shiftable abutment member 122.

If the 100 percent position is selected relay K52 is energized providing power through K52–1A, K54–3B, and "mode selected" relay K47 to relay K66. If the lens carriage is not already in the 100 percent position, LS–22 is deactivated (closed). Relay K47, it is noted, is energized whenever any mode is selected. Power is also provided, through K52–1A and K53–3B, to relay K69. K66–2 provides power to solenoid L5 which, when energized, routes the air pressure directly from the compressor 142 through line 144 solenoid L6 to the air cylinder 128 via line 146 or 148. This pressure is sufficient from compressor 142 to cause movement of the piston 130 and consequently the main lens carriage 38. K66–4 provides power to solenoid L7 so that the shiftable abutment member 122 is moved out of the path of the lens carriage at the appropriate times. K54–1B and K69–1A provide power to solenoid L6A to direct the air pressure from the compressor 142 through line 148 to move the carriage to the left. Movement to the left, once begun, continues until the abutment rod 106 strikes the first abutment surface 112 at which time the lower portion of the downward extension 108 supporting the abutment rod 106 trips limit switch LS–22. The tripping of LS–22 deenergized K66 which in turn deenergizes L5, the air compressor solenoid to remove the compressor pressure terminating the movement of the piston 130 and carriage 38. At this time, a low holding pressure is maintained through L6A and L5 to hold the carriage against the 100 percent stop. This second pressure source 150 creates a lesser pressure value than that of the compressor and may be attained through another functioning part of the reproducing machine, for example, the machine accumulator. Normal machine inactivation removes this supplemental pressure and permits movement of the carriage a slight distance from the stop against which it was previously contacting.

To move the lens carriage to the 50 percent or extreme right-hand location, two modes of operation must be considered. When the carriage is in the 65 percent position and the 50 percent mode is selected, relay K54 is energized causing energization of relay K66 through limit LS–25, K54–3B and K47–3. The energization of L6A permits the flow of air into the air cylinder through line 148 to move the carriage and lenses to the left until limit switch LS–24 is deactuated. This movement is sufficient so that the shiftable abutment member 122 may clear the abutment rod 106. The deactuation of limit switch LS–24 causes relay K69 to pull in through K52–1B and K53–2B. Relay K69 is then latched through K69–4. LS–23 and LS–24 are of the type that they can only be actuated when moved in one direction. LS–24 can only be actuated when the extension 108 hits it going to the right while LS–24 is actuated when it is moved to left as viewed in the figures.

Power is provided through K66–4 to trip rotary solenoid L7 to move the abutment member 122 out of the interference path with the abutment rod 106. Power is also provided through K54–1A and K69–2A to solenoid L6B to reverse the direction of the piston 130 and carriage 38 so that it can then proceed to the right until carriage extension 108 contacts and trips limit switch LS–25. Actuation of limit switch LS–25 drops out relay K66 which deenergizes solenoid L5 to remove the flow of air pressure from the compressor. L6B remains energized permitting the flow of the low pressure air form source 150 into the air cylinder via line 146 to hold the carriage against the abutment stop 118.

When the lens carriage is in other than the 65 percent position and the 50 percent button 140 is depressed, relay K54 is energized. Relay K66 is then energized through K54–3A and K47–3. K69 is energized through limit switch LS–24, K52–1B and K53–3B and latches through K69–4. Power is provided to rotary solenoid L7 through K66–4 to remove the abutment member 122 from the path of the carriage extension 108 to permit its motion therepast. Power is then provided to solenoid L5 to permit the flow of air pressure from the compressor to move the piston and carriage to the right. L6B is energized through K54–1A and K69–2A causing the carriage to move to the 50 percent stop actuating switch LS–25. Again LS–25 drops out K66 which drops L5 and thereby drops the air pressure while solenoid L6B remains energized to continue the holding of the carriage against the abutment surface 118.

In considering the motion of the carriage to the 65 percent position, several conditions must be considered. If the carriage is to the right of the 65 percent position but not at the 50 percent position and 65 percent position is selected, relay K53 becomes actuated. LS–23 is not actuated in this condition. Relay K66 then becomes energized through limit switch LS–24, K52–1B and K54–3B and K47–3. Relay K69 does not become energized. Therefore, solenoid L6B is energized through K54–1B and K59–1B. Solenoid L5 is energized through K66–2 so that the lens carriage moves to the right to the 50 percent position. At the 50 percent position limit switch LS–25 is actuated which provides power through K53–3A to K69 and K69 latches through K69–3, K53–3A and LS–23. Solenoid L7 then becomes energized moving the abutment member 122 out of the path of the carriage.

After this condition is reached, K69–1B opens and L69–1A closes providing power to solenoid L6A to reverse the direction of motion of the piston and carriage so that it may move to the left until it actuates limit switch LS–23. When LS–23 is actuated, the holding circuit for K69 no longer exists and K69 drops out. Rotary solenoid L7 therefore loses power and the stop is moved into the path of the carriage. L6B is again energized through K54–1B and K69–1B and the carriage again reverses direction so that it may move to the right into the contact with the abutment member 122. This movement continues until the abutment member is contacted by the face 116 of the abutment rod 106 on the main lens carriage at which time LS–24 is actuated, dropping out K66 and solenoid L5. L6B remains energized permitting pressure source 150 to hold the carriage against the abutment member 122.

If the carriage is at the 50 percent position and the 65 percent position is selected to energize relay K53, it will proceed to the 65 percent position as described above with the exception that there is no initial movement to the right.

If the machine has previously been left in the 65 percent position and the 65 percent button is again selected, relay K53 becomes energized. Normal machine inactivation would have permitted the slight shifting of the carriage to the left. Relay K66 is then energized through limit switch LS–24, K52–1B, K54–3B and K47–3. K66–2 energized compressor solenoid L5 giving sufficient pressure to move the carriage to the right. Solenoid L6B is energized then through K54–1B and K69–1B so that the carriage moves to the right until it hits the 65 percent stop and actuates LS–24. Actuating LS–24 drops K66 lowering pressure while L6B remains energized to permit the carriage to be held against the stop.

As can be understood, the above described optical assembly is designed to move the main lens carriage to any one of a plurality of preselected positions and to hold it there by means of reduced pressures holding the carriage against abutment stops. The movement of the main lens to one of the alternate positions from a previous location is readily effected by the mere depression of a size reduction button which may vary, in association therewith, the rate of optical scan.

While the present invention, as to its objects and advantages, has been described as carried out in a specific embodiment thereof, it is not desired to be limited thereby; but it is intended to cover the invention broadly within the scope of the appended claims.

What I claim is:

1. An optical assembly including
a main lens means in a frame movable along an optical path,
supplemental lens means mounted on said frame and movable with said main lens means,
hinge means coupling said main lens means and said supplemental lens means to permit the movement of said supplemental lens means into and out of the optical path,
cam means fixedly positioned with respect to said main lens means adjacent the optical path and
cam follower means on said supplemental lens means engageable with said cam means as said main lens means is moved along the optical path to cause movement of the supplemental lens means into and from the optical path.

2. The assembly as set forth in claim 1 and further including means resiliently urging said supplemental lens means out of the optical path.

3. The assembly as set forth in claim 2 and further including control means to move said main lens means along the optical path between positions whereat said main lens means only is in the optical path and whereat said main lens means and said supplemental lens means are in the optical path.

4. An optical assembly including
a main lens means, movable along an optical path,
means to move said main lens means along an optical path,
a first supplemental lens means pivotally mounted on said main lens means,
first cam follower means on said first supplemental lens means,
a second supplemental lens means pivotally mounted on said main lens means on the side of the optical path remote from said first supplemental lens means,
second cam follower means on said second supplemental lens means,
a first cam surface fixedly positioned with respect to said main lens means adapted to coact with said first cam follower means to permit the movement of said first supplemental lens means into and from the optical path as the main lens means is moved along the optical path and
second cam means positioned on the side of the optical path remote from said first cam means and offset along the optical path with respect to said first cam means, said second cam means being coactable with said second cam follower means to permit the movement of said second supplemental lens means into and from the optical path as the main lens means is moved along the optical path.

5. The assembly as set forth in claim 4 and further including control means to selectively move said main lens means from a first position along the optical path wherein both of said supplemental lens means are out of the optical path, a second position along the optical path wherein only said second supplemental lens means is out of the optical path and a third position wherein only said first supplemental lens means is out of the optical path.

6. The assembly as set forth in claim 5 wherein said first cam means includes two surfaces, a first surface to cause the movement of said first supplemental lens means into the optical path as said main lens means approaches the second position from the first position and a second surface to cause the movement of said first supplemental lens means out of the optical path as said main lens means moves from the second position toward the third position.

7. An optical assembly comprising
a main lens means in a frame movable along a fixed optical path,
a plurality of supplemental lens means movable with and pivotally mounted on said frame about parallel axes in a plane perpendicular to the optical path,
a plurality of cam means fixedly positioned with respect to said main lens means adjacent the optical path, and
cam follower means positioned on each of said supplemental lens means cooperable with said cam means such that movement of said main lens means and said supplemental lens means along the optical path will cause said cam follower means to ride along said cam means to move said supplemental lens means into and from the optical path.

8. The optical assembly as set forth in claim 7 and further including means resiliently urging said cam follower means into riding contact with said cam means.